US010019300B2

(12) United States Patent
Jayaprakash Bharadwaj et al.

(10) Patent No.: US 10,019,300 B2
(45) Date of Patent: *Jul. 10, 2018

(54) LIVE ERROR RECOVERY

(71) Applicant: Intel Corporation, Santa Clara, CA (US)

(72) Inventors: Prahladachar Jayaprakash Bharadwaj, Sunnyvale, CA (US); Alexander Brown, Mountain View, CA (US); Debendra Das Sharma, Saratoga, CA (US); Junaid Thaliyil, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/042,463

(22) Filed: Feb. 12, 2016

(65) Prior Publication Data

US 2016/0335148 A1    Nov. 17, 2016

Related U.S. Application Data

(63) Continuation of application No. 13/892,894, filed on May 13, 2013, now Pat. No. 9,262,270.

(Continued)

(51) Int. Cl.
    *G06F 11/00* (2006.01)
    *G06F 11/07* (2006.01)
    *G06F 11/14* (2006.01)

(52) U.S. Cl.
    CPC ...... *G06F 11/0745* (2013.01); *G06F 11/0736* (2013.01); *G06F 11/0793* (2013.01); *G06F 11/1415* (2013.01); *G06F 11/1443* (2013.01)

(58) Field of Classification Search
    CPC .................. G06F 11/0745; G06F 11/0793
    See application file for complete search history.

(56) References Cited

U.S. PATENT DOCUMENTS

5,528,749 A    6/1996    Landis et al.
6,728,210 B1   4/2004    El-Khoury et al.
(Continued)

FOREIGN PATENT DOCUMENTS

CN    1533198 A    9/2004
CN    1608256 A    4/2005
(Continued)

OTHER PUBLICATIONS

Supplementary European Search Report in EP Application No. 13 86 9266, dated Jul. 18, 2016, 12 pages.
(Continued)

*Primary Examiner* — Thien Nguyen
(74) *Attorney, Agent, or Firm* — Alliance IP, LLC

(57) ABSTRACT

A packet is identified at a port of a serial data link, and it is determined that the packet is associated with an error. Entry into an error recovery mode is initiated based on the determination that the packet is associated with the error. Entry into the error recovery mode can cause the serial data link to be forced down. In one aspect, forcing the data link down causes all subsequent inbound packets to be dropped and all pending outbound requests and completions to be aborted during the error recovery mode.

20 Claims, 11 Drawing Sheets

Related U.S. Application Data

(60) Provisional application No. 61/746,972, filed on Dec. 28, 2012.

(56) References Cited

U.S. PATENT DOCUMENTS

| | | | |
|---|---|---|---|
| 7,836,328 | B1 | 11/2010 | Puri et al. |
| 9,262,270 | B2 | 2/2016 | Bharadjwaj et al. |
| 2005/0283638 | A1* | 12/2005 | Kato ............... G06F 11/0706 714/2 |
| 2006/0212762 | A1 | 9/2006 | Zimmer et al. |
| 2006/0271718 | A1 | 11/2006 | DiPlacido, Jr. et al. |
| 2007/0240018 | A1* | 10/2007 | Nalawadi ........... G06F 11/1438 714/23 |
| 2008/0109565 | A1 | 5/2008 | Ajanovic et al. |
| 2009/0106636 | A1 | 4/2009 | Jenkins et al. |
| 2011/0209027 | A1* | 8/2011 | Schmidt ............... H04L 1/0045 714/752 |
| 2012/0079312 | A1* | 3/2012 | Muthrasanallur ... G06F 11/0793 714/5.1 |
| 2012/0131420 | A1 | 5/2012 | Chen et al. |
| 2013/0159764 | A1* | 6/2013 | Adar .................. G06F 11/0793 714/5.1 |
| 2014/0105101 | A1* | 4/2014 | Vu ....................... H04L 1/0008 370/328 |
| 2014/0189427 | A1 | 7/2014 | Bharadwaj et al. |

FOREIGN PATENT DOCUMENTS

| | | |
|---|---|---|
| CN | 1859358 A | 11/2006 |
| CN | 102833036 A | 12/2012 |
| JP | 2008/015856 | 1/2008 |
| JP | 2012/010020 | 1/2012 |
| KR | 10-2007/00926 | 9/2007 |
| TW | 200813707 A | 3/2008 |
| TW | 200834316 A | 8/2008 |
| WO | 2014/105768 A1 | 7/2014 |

OTHER PUBLICATIONS

Anonymous, PCI Express Wikipedia, Dec. 27, 2012, Retrieved from the Internet: URL:https://en.wikipedia.org/w/index.php?title=PCI_Express&oldid=529970301 [retrieved on Jul. 1, 2016], 19 pages.
First Office Action in CN Application No. 201380062299.7, dated Dec. 28, 2016, with English translation, 31 pages.
Office Action in TW Application No. 104134879, dated Nov. 29, 2016, with English translation, 5 pages.
Office Action and Search Report in TW Application No. 104134879, dated Aug. 23, 2016, no English translation, 3 pages.
International Search Report and Written Opinion in International Application No. PCT/US2013/077347, dated Apr. 15, 2014, 9 pages.
USPTO May 7, 2015 Nonfinal Rejection in U.S. Appl. No. 13/892,894, 41 pages.
Office Action and Search Report in TW Application No. 102146392, dated Jun. 10, 2015, English translation, 11 pages.
PCI Express Base Specification 3.0, Nov. 10, 2010, p. 137, 1 page.
International Preliminary Report on Patentability in International Application No. PCT/US2013/077347, dated Jul. 9, 2015, 8 pages.
USPTO Sep. 23, 2015 Notice of Allowance in U.S. Appl. No. 13/892,894, 14 pages.
Notice of Preliminary Rejection in KR Application No. 2015-7014064, dated Jul. 5, 2016, with English translation, 22 pages.
Second Office Action in CN Application No. 201380062299.7, dated Jun. 12, 2017, with English translation, 29 pages.

* cited by examiner

LIVE ERROR RECOVERY

RELATED APPLICATIONS

This application is a continuation (and claims the benefit of priority under 35 U.S.C. § 120) of U.S. application Ser. No. 13/892,894, filed May 13, 2013, entitled "LIVE ERROR RECOVERY," Inventors Prahladachar Jayaprakash Bharadwaj, et al., which claims the benefit of priority to U.S. Provisional Patent Application Ser. No. 61/746,972, filed Dec. 28, 2012. The disclosures of the prior applications are considered part of and are incorporated by reference in their entirety in the disclosure of this Application.

FIELD

This disclosure pertains to computing system, and in particular (but not exclusively) to link error containment.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
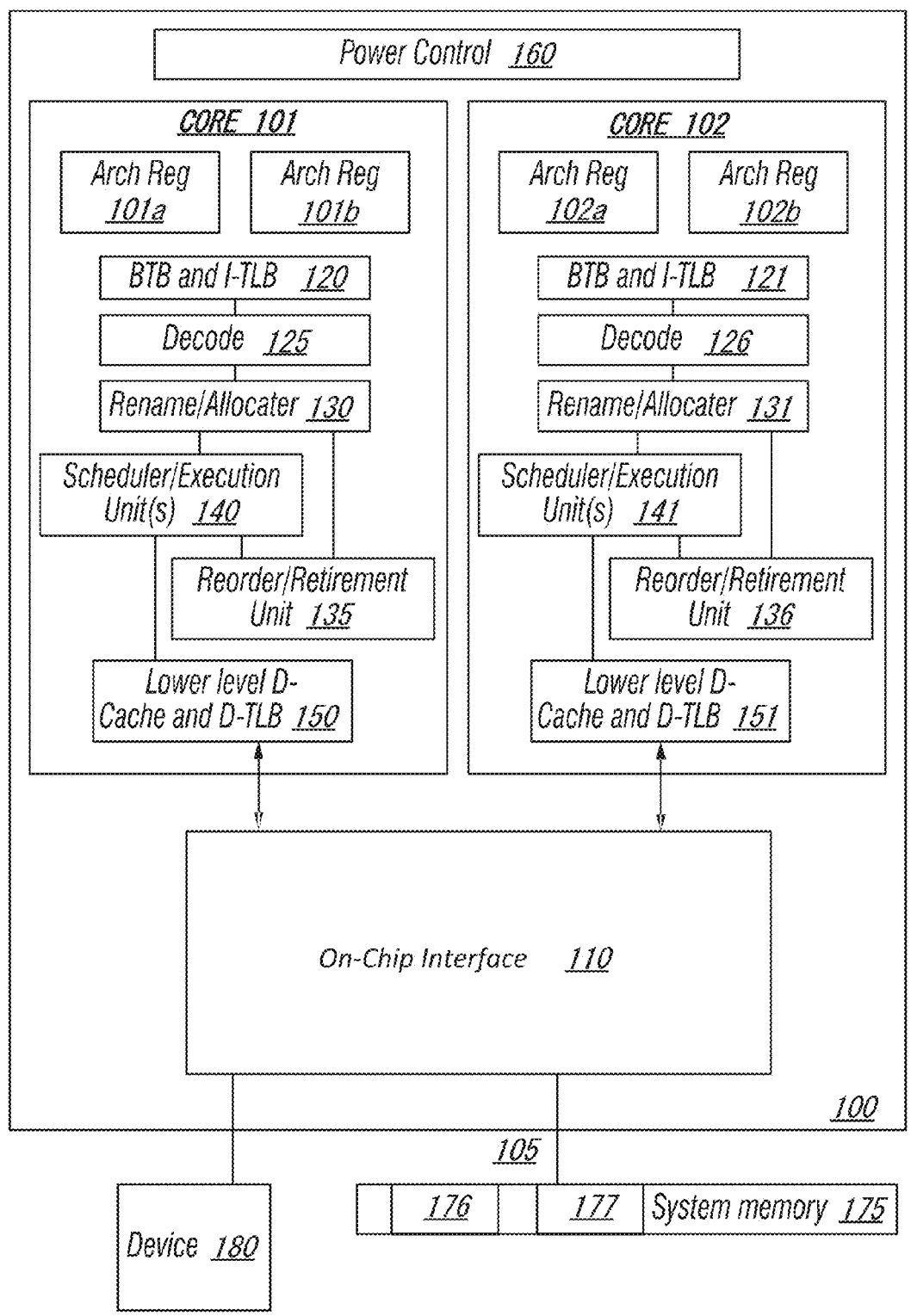
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
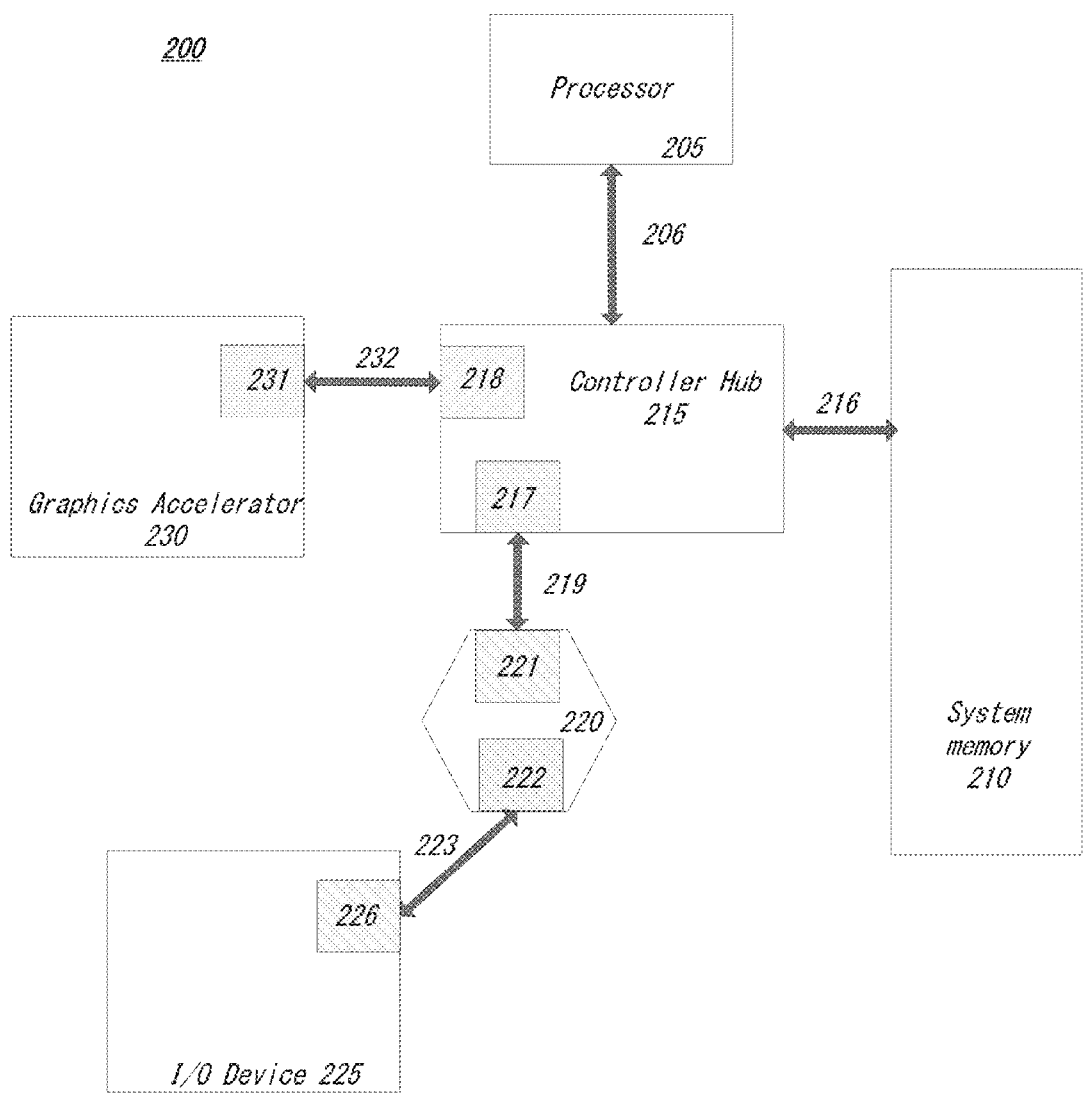
FIG. 2 illustrates an embodiment of a computing system including an interconnect architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
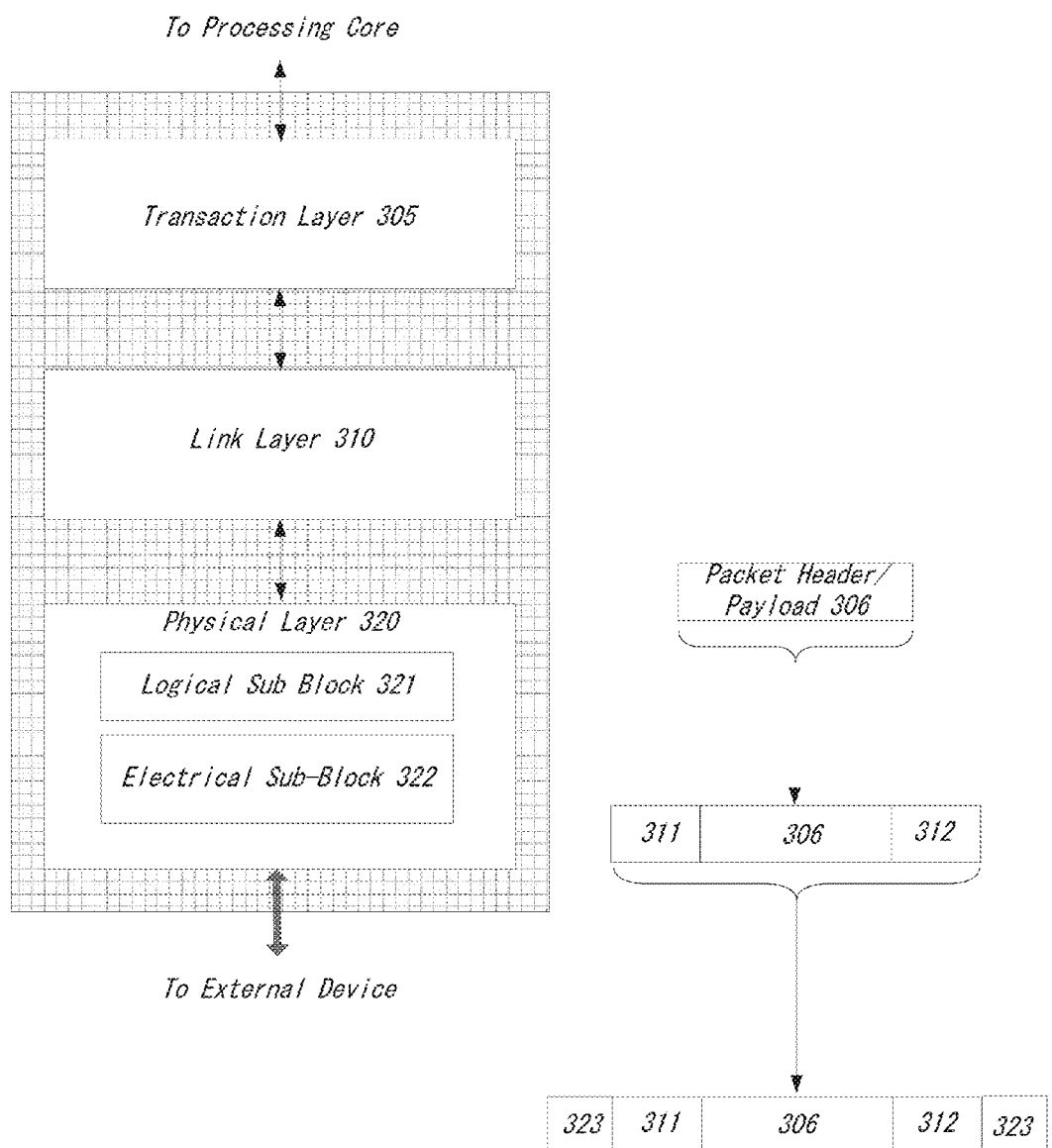
FIG. 3 illustrates an embodiment of a interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCie stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 215 in FIG. 2, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
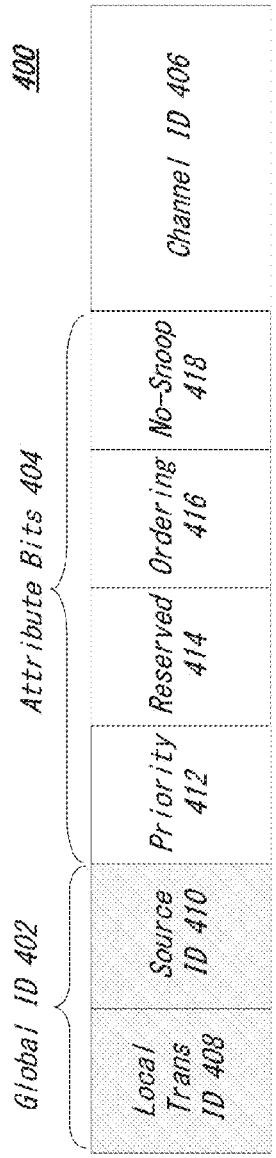
FIG. 4 illustrates an embodiment of a request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link Layer

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 5:
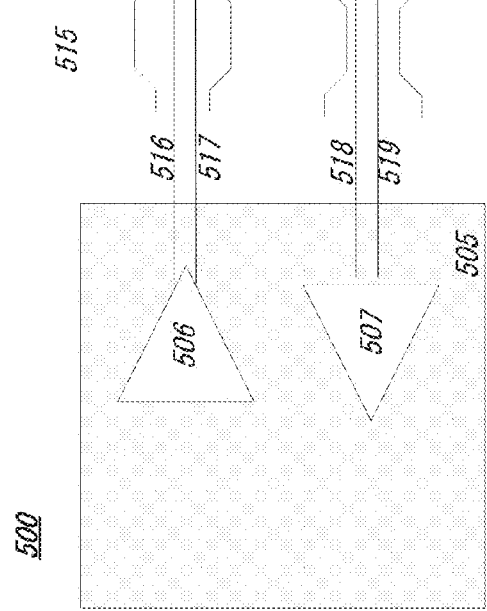
FIG. 5 illustrates an embodiment of a transmitter and receiver pair for an interconnect architecture.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Error handling and containment can be important elements of an interconnect platform such as PCIe, as well as other interconnect platforms, including Mobile Industry Processor Interface (MIPI), Intel® Quick Path Interconnect (QPI), and other interconnect platforms and architectures. For instance, in a multi-socket environment, an error caused by a single transaction can result in race conditions of dropped data, system-wide resets, and other effects. In some traditional architectures, inbound packets associated with an error have been allowed to continue to propagate within a system until an error handler was invoked and took appropriate action. Wait times for error handler action have, in some instances, resulted in large windows where an error, and subsequent data, were allowed to remain uncontained, among other effects. In such instances, system (host) memory may be left unprotected as subsequent write transactions directed at system memory or completion transactions with data continue to propagate until the error handler takes action to remediate a detected error, among other issues.

In some implementations, a live error recovery (LER) feature can be supported on ports in an interconnect architecture, such as PCIe-compliant ports. LER can be utilized to trap errors at a root port where the error is detected and prevent propagation of the error beyond the port. Detection of an error can trigger live error recovery by causing a link to be forced into a link down state causing all outbound requests to be aborted and all inbound packets following the packet that triggered the LER condition to also be dropped. This can cause the error to be contained at a particular port where the error was detected. The error can be reported to global error detection and handling modules, including identification of the port and link where the error was detected. Software-based error assessment tools, such as error handlers, can then process and clear the reported error, in some cases, without a system-wide reset. Upon confirming that the inbound and outbound queues of the port of the downed link have been drained, recovery of the link can be initiated so as to bring the link back up to a transmitting state (e.g., following containment and clearing of the error), again, without a system-wide reset.

In one example implementation, a live error recovery (LER) mode can include detection of a particular defined error, such as an Advanced Error Reporting (AER), other PCIe error, or a proprietarily-defined error on an inbound or outbound path of a PCIe-compliant port. An error mask of the error can be identified and used to determine whether the error type has been defined to trigger the (LER) mode. On an error that triggers an LER mode event, the associated link of the port is forced to a Link Down state and all outbound requests and inbound transactions are dropped. Further, completion packets are also be dropped, although, in some cases, interface logic can synthesize master abort completions to be sent to a core (or other PCIe port) that originated the request, in lieu of the dropped completions. A software-based controller can check a LER mode "queue empty" status indicator to identify that all the inbound (and outbound) queues are empty and the controller can trigger an exit from the LER mode to allow link training for the down link to begin to recover the link. In one example, functionality associated with the LER mode can be accommodated through a PCIe Extended Capability structure, or other register or structure for easy identification of LER-related conditions as well as future flexibility.

Figures 6, 7:
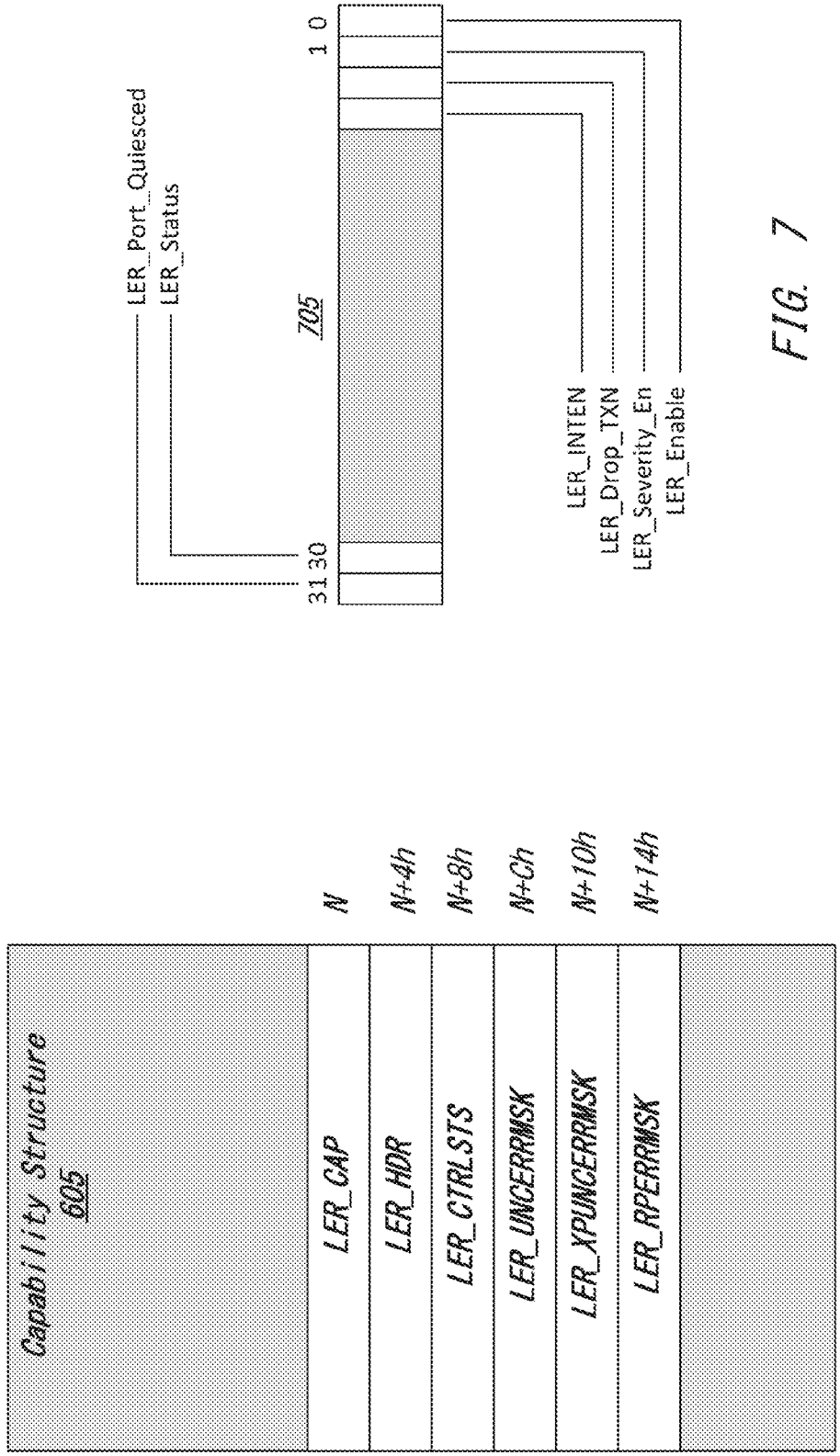
FIG. 6 illustrates a representation of an example capability structure.
FIG. 7 illustrates a representation of an example control status register.

Turning to FIG. 6, a simplified representation of an example LER capability structure 605 is shown. Various fields or portions can be provided within an example capability structure. For instance, in the example of FIG. 6, capability filed can include an LER capability (LER_CAP) field, an LER header (LER_HDR) field, an LER control status (LER_CTRLSTS) field, an LER uncorrectable error mask (LER_UNCERRMSK) field, an LER uncorrectable proprietary error mask (LER_XPUNCERRMSK) field, an LER root port error mask (LER_RPERRMSK) field, among potentially other fields. An LER_CAP capability field can identify the LER capability structure as well as point to the next capability structure. The LER_HDR field can be at least partially vendor-defined and identify the version and features of the LER functionality adopted by a particular device. Further, the LER_CAP and LER_HDR can identify whether (and to what extent) a device supports LER. Through the identification of a version of LER supported by a particular device (and corresponding port(s)), software controllers can determine the LER features supported by the particular device, among other examples.

In the case of a LER_CTRLSTS capability field, various aspects and control bits can be provided for use in providing an LER mode. For instance, the LER_CTRLSTS field can embody an LER control and status register with various control bits to enable the LER and various status bits of the LER functionality including the queue empty condition, LER severity mapping, aggressive dropping modes, interrupt enablement, severity remapping, among other examples.

Various error masks can be provided through an LER capability structure for use in identifying which error codes are to trigger an LER condition. PCIe and other platforms can support a variety of error condition codes and corresponding masks. LER can provide additional masks that can be processed together with standard error masks to cause LER to be enabled, among other examples. In one example, LER masks can be provided that map to corresponding error status masks provided through the port's architecture. For instance, a PCIe platform can include an uncorrectable error mask register, a root port error mask register, one or more proprietary error mask registers (e.g., to extend the set of errors that can be masked beyond what has been defined in the platform's formal specification), and the LER capability structure can include corresponding error masks such as an LER uncorrectable error mask (LER_UNCERRMSK) and an LER uncorrectable proprietary error mask (LER_X-PUNCERRMSK), and an LER root port error mask (LER_RPERRMSK), among potentially other examples. In one implementation, the LER_UNCERRMSK bits can bits can serve to mask error events from the LER mode. In other words, based on the values of the LER error masks, it can be determined whether a particular error type (e.g., also identified or recognized in the platform's error mask registers) has been designated to trigger LER upon detection. A user, such as an administrator, can define which mask bits of the LER mask registers are to be set to select which errors trigger LER. As an example, if a bit corresponding to a malformed transaction layer packet (TLP) has a value set in an uncorrectable error status mask register of a platform (e.g., a PCIe-compliant platform) to indicate that such TLP errors are to be logged as an uncorrectable (or other) error, and a corresponding bit of an LER_UNCERRMSK register indicates that the same errors are to trigger LER, when a malformed TLP error is detected (e.g., using transaction layer logic), LER mode can be triggered, among other potential examples.

Turning momentarily to FIG. 7, a representation of an example LER control and status register (or LER_CTRLSTS capability field) 705 is illustrated. In the particular example of FIG. 7, various fields and control bits can be provided, such as an LER_Status bit, an LER_Port_Quiesced, an LER Enable bit, an LER_Severity_Enable bit, an LER_Drop_TXN bit, and an LER_INTEN bit, among potentially other examples. In one example, the LER_Status, or status, bit can indicates that an error was detected that caused a PCIe port to go into a live error recovery (LER) mode. As noted above, in LER mode, the link can be immediately forced into a Link Down disabled state and all outbound transactions are aborted (including packets that may have caused the error) when this bit is set. Further, after the status bit is set, it may only be cleared after all the associated unmasked status bits are cleared, or the corresponding LER mask bits are set, among other conditions and examples. Once the unmasked error conditions are cleared, then this bit may be cleared by software writing a value (e.g., "1") to the field. Clearing the status bit after an LER event can cause the link to automatically begin retrain to a transmitting state, ending the aborting of outbound transaction and blocking of inbound transactions. In some implementations, forcing a link to a down state can be configured such that the LER event does not trigger a "surprise Link-Down" error. Further, in some implementations, some devices, such as certain PCIe cards, can be configured to go into internal reset when they receive training sequences that indicate the "Disabled" state, among other examples.

Continuing with the example of FIG. 7, a status register 705 can include a port quiesced bit (e.g., LER_Port_Quiesced) indicating that the port has no more pending inbound or outbound packets after the port has entered LET mode. The port quiesced bit can be used to confirm that packets have successfully drained from a link forced into a link down state following an LER event. Further, a software controller, such as an error management tool or error handler, can reference the port quiesced bit to identify when it is safe to clear the LER status bit and allow the port to be brought out of LER mode.

Other bits can be utilized to enable various functionality provided through an LER mode. For instance, an LER interrupt enable bit (e.g., LER_INTEN) can indicate whether an interrupt, such as a Message Signaled Interrupt (MSI), is to be generated when an LER event is triggered (e.g., through the setting of the LER status bit). Further, an LER transaction drop bit (e.g., LER_Drop_Txn) can be used to identify whether, after entering LER, subsequent transactions will be dropped as soon as the port configuration allows. Additionally, an LER severity change bit (e.g., LER_Severity_En) can be provided that, when set, is to force errors that trigger LER mode to be signaled as a correctable error, rather than an uncorrectable (or similar) error. For instance, enabling LER_Severity_En can cause an error that would ordinarily signal as Uncorrectable Non-Fatal Severity 1 or Uncorrectable Fatal Severity 2 to instead be signaled as Correctable Severity 0. Such a bit can be set, for instance, to account for enhance error handling capabilities at a device, among other circumstances. Further, an additional bit (e.g., LER Enable) can be provided to selectably enable or disable LER functionality, effectively turning on or off LER functionality.

Figure 8:
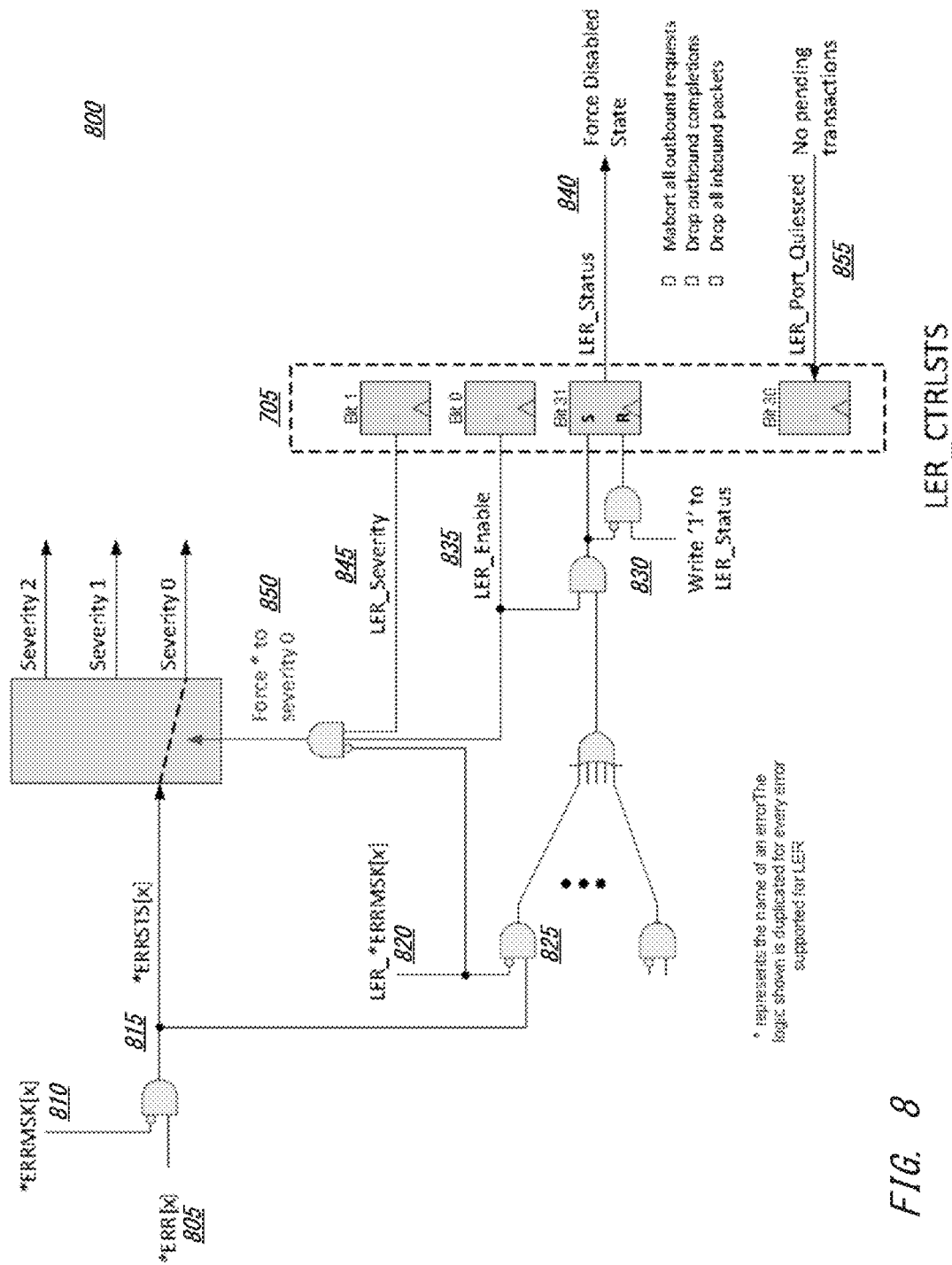
FIG. 8 illustrates a schematic diagram of example error logic in accordance with one embodiment.

Turning to FIG. 8, a schematic block diagram 800 is shown of example logic that can be used to implement at least a portion of LER functionality. For instance, an error signal 805 can be received corresponding to a particular type of error detected at a port. The error condition of the signal 805 can be masked by a standard error status mask 810 to determine (e.g., at 815) whether the error condition is of a severity higher than "Severity 0" (e.g., a correctable error). If so, a signal 815 can progress (e.g., to AND gate 825) to be compared against LER error mask 820 to determine whether the error condition is to trigger an LER mode. If the LER functionality is enabled (e.g., at 835 of LER control status register 705) and LER applies to the detected error (at 805), an LER status bit can be set (e.g., at 830) to invoke LER mode and force the link into a disabled state 840. For instance, a handshake, disable training sequences, or other signals can be sent to send the link into a down state. In the disabled or down state, a master abort is applied to all outbound requests (e.g., by constructing a complete with all "1"'s), all outbound completions are dropped, and all inbound packets are to be dropped. Further, if a severity change bit 845 is set, logic (at 850) can force the severity of the error condition from the higher severity rating (e.g., uncorrectable Severity 1 or Severity 2) to indicate a lower, correctable severity rating. This can ensure that more invasive steps (e.g., system wide resets) are not performed in response to the error condition (communicated through signal 805).

In LER mode, outstanding transactions and inbound and outbound packets are dropped and drained from the link. When hardware (or software) logic drops the pending transactions, a port quiesced bit 855 can be set. Another controller, such as an at least partially software-based error handler, can attempt to resolve and analyze the error condition. The error handler (or other tool) can further clear error registers (e.g., upon resolution of the error condition). Additionally, upon clearing the error registers, the error handler can identify that no transactions are pending on the link (or port) by virtue of the value of the port quiesced bit 855, and clear the LER status bit to cause the link to exit LER mode. In one example, an exit from LER includes retraining of the link and bringing back up to an active transmitting state.

Figure 9:
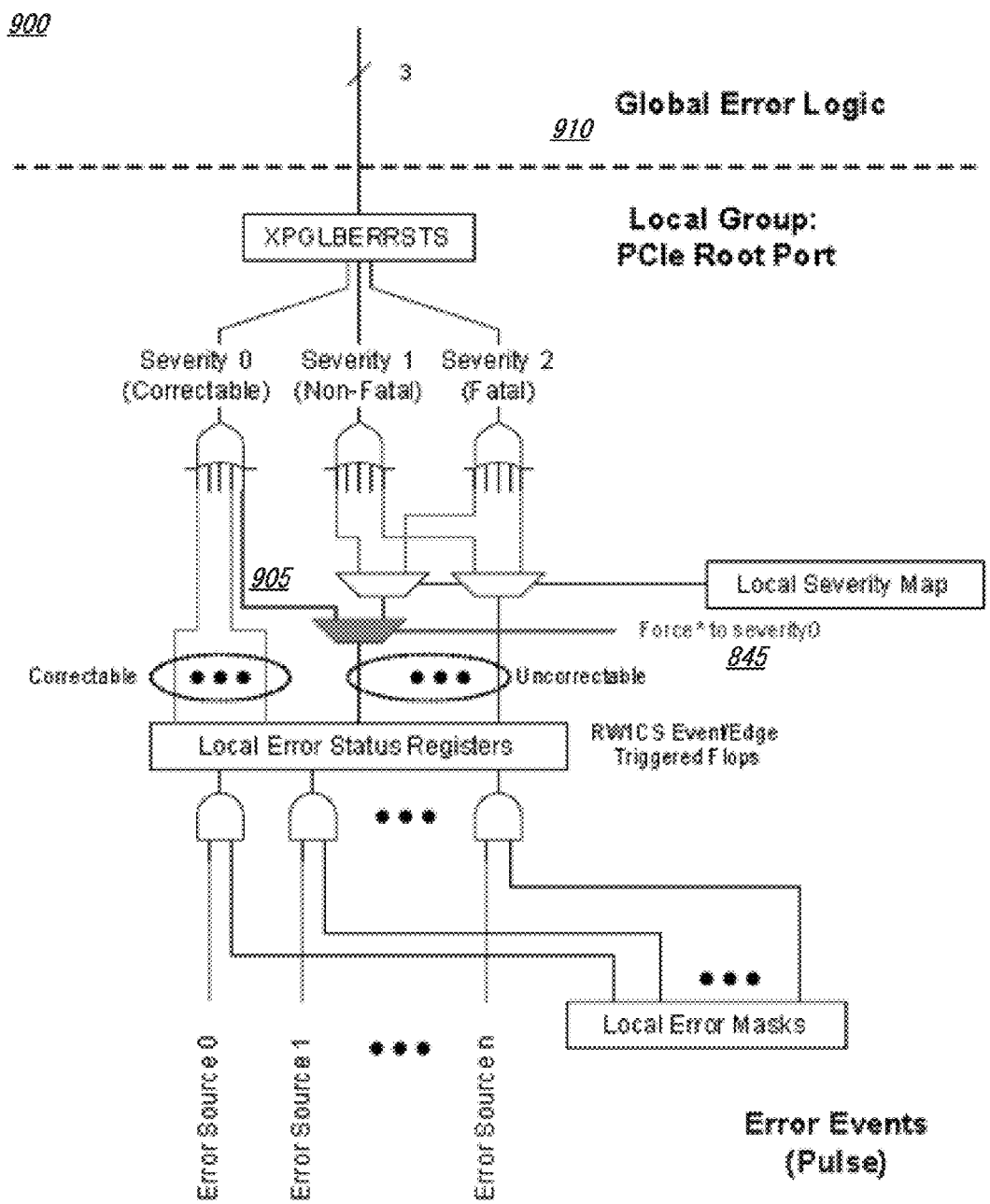
FIG. 9 illustrates another schematic diagram of example error logic in accordance with one embodiment.

As noted above, an LER control status register (e.g., 705) can include a control bit to change the severity of the LER mapping to change the severity of an error code triggering the LER. For instance, as shown in the example illustrated by the schematic diagram 900 of FIG. 9, an LER severity change (or mapping) bit (e.g., at 845) in the LER control status register can be enabled. Enabling the LER control status register can cause an error condition (e.g., 905) that would ordinarily have been treated as an uncorrectable error (e.g., without LER enabled) to be instead signaled as a correctable Severity 0 error, instead of a Severity 1 or 2. Accordingly, in this particular example, a corresponding Severity 0 bit can be set, a Severity 0 MSI can be generated, and the Severity 0 ERR[0] pin can be asserted instead of Severity 1 or 2. Without severity remapping, a higher-severity interrupt, such as a system management interruption (SMI), non-maskable interrupt (NMI), machine check architecture (MCA) error, or other interrupt or error event can be triggered even though the error is contained at the port by the LER mode. The example severity remapping can make sure that errors triggered due to LER are correctly contained by remapping the severity to lower severity (correctable errors) so that a SMI, NMI, etc. would not be triggered from the global error generation logic (e.g., 910). Instead, global error generation logic 910 can process the error as a Severity 0 error.

As introduce above, in LER mode, different packets can be handled immediately after the LER mode is triggered so as to contain an error at a particular port. For instance, the LER can be triggered on the same clock cycle the error is recorded in the error registers to initiate the process of bringing down the affected link. Table 1 shows how various packets types are to be handled upon triggering LER mode:

TABLE 1

| Packet Type | Inbound Path | Outbound Path | Comments |
|---|---|---|---|
| Non-Posted TLP | Dropped | Dropped | Credits re-initialized when the line retrains |
| Posted TLP | Dropped | Dropped | Credits re-initialized when the line retrains |
| Completion TLP | Dropped; new master abort synthesized completion sent | Dropped | Core will hang without a CMP, so a master abort completion is synthesized immediately after LER and completion credits are re-initialized when link retrains |

As noted above, in some instances, inbound completion packets, while being dropped in LER mode, can be intercepted and synthesized so as to communicate a corresponding master abort completion to the core responsible for sending the corresponding request to which the complete was to apply. In some instances, a core can await the dropped completion and the synthesized master abort completion can prevent the core from hanging.

Different classes of error can be enabled for LER. Error classes can include, for instance, errors associated with an incoming (e.g., from another device or associated remote agent) packet (such as a TLP), errors associated with an outgoing (e.g., outbound to another device or associated remote agent) packet, as well as non-packet errors, such as a defective port error, among other examples.

Figure 10:
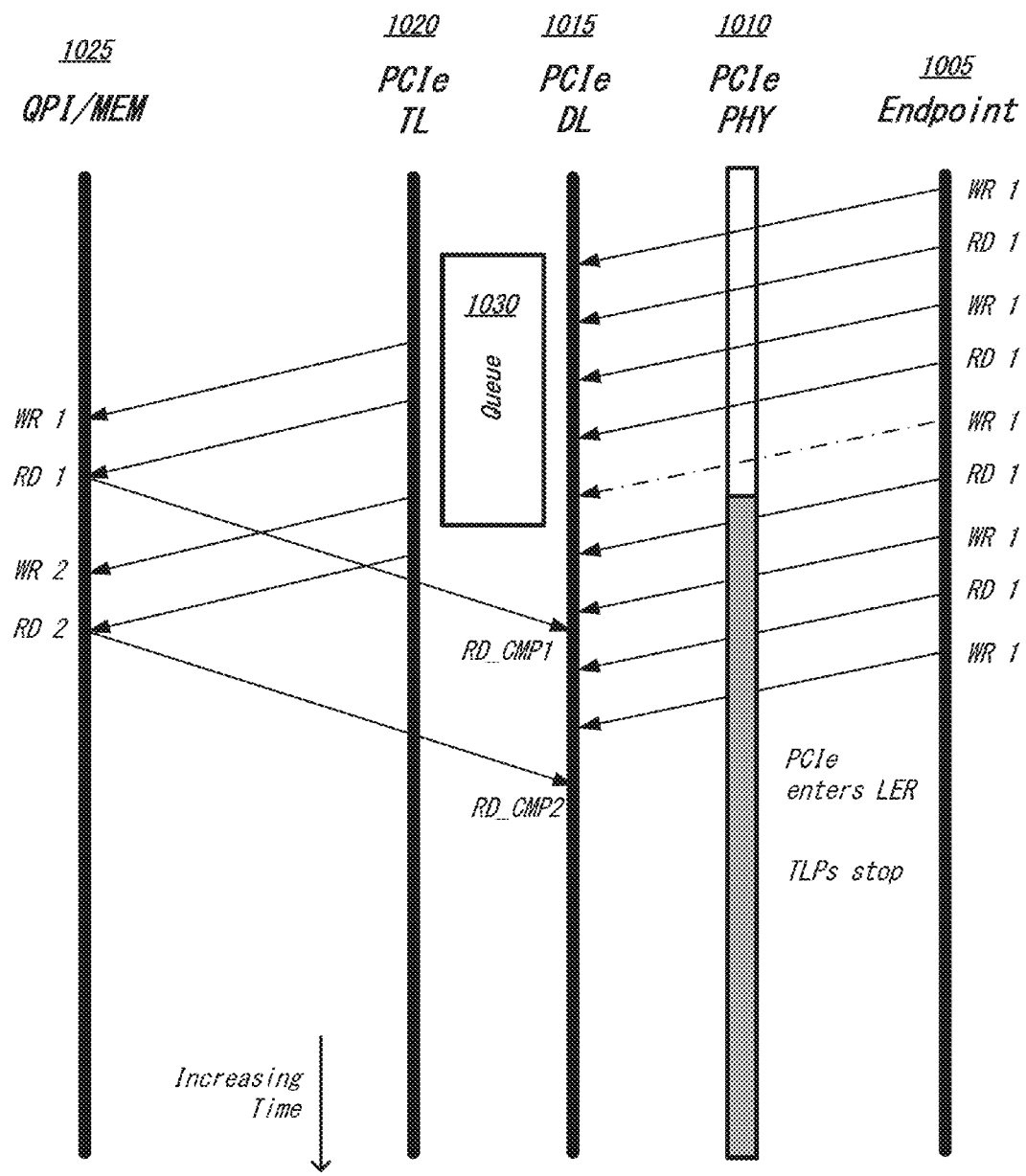
FIG. 10 illustrates a flow diagram of an example entry into an error recovery mode.

Turning to FIG. 10, a flow diagram is shown illustrating an example LER event relating to an error associated with one or more incoming TLPs on a link. An endpoint 1005 can be communicating with a host (e.g., 1025) over a port of a PCIe-compliant link, including a PCIe Physical layer 1010, data link layer 1015, and transaction layer 1020. Multiple write (WR) and read (RD) requests packets can be sent over a PCIe physical layer 1010 in a transmitting L0 state. Some of the packets can be queued or buffered in a TLP queue 1030 before being passed to system or host memory 1025, among other examples.

In the example of FIG. 10, an error, such as a malformed TLP error, can be determined in connection with a write request packet WR3. Port error detection logic can detect the error and further determine that the error is of a type that is to trigger the LER state. Accordingly, the detection logic can immediately (e.g., on the same clock cycle) assert the LER status signal and thereby trigger the transition of the associated link to a down or disabled state 1035. The packet responsible for the error can be dropped, in some cases, according to standard protocol of the platform based on the error (e.g., consistent with the PCIe formal specification). Further, the asserted LER status signal can also serve to drop every subsequent inbound packet (e.g., RD 3, WR 4, RD 4, WR 5, etc.) from the endpoint 1005 while the link transitions to the disabled state to provide error containment at the port. In this manner, memory (e.g., 1025) can be protected from corruption from TLPs following the TLP (e.g., WR 3) responsible for the error condition. The endpoint 1005, upon identifying entry into the disabled state may stop sending additional TLPs. Further, outbound packets (e.g., RD_CMP1, RD_CMP2, etc.) can also be dropped during entry into and within the LER mode. However, in some implementations, if an outbound TLP is being transmitted when LER mode is initiated, transmission of the outbound TLP may be allowed to complete uninterrupted.

Figure 11:
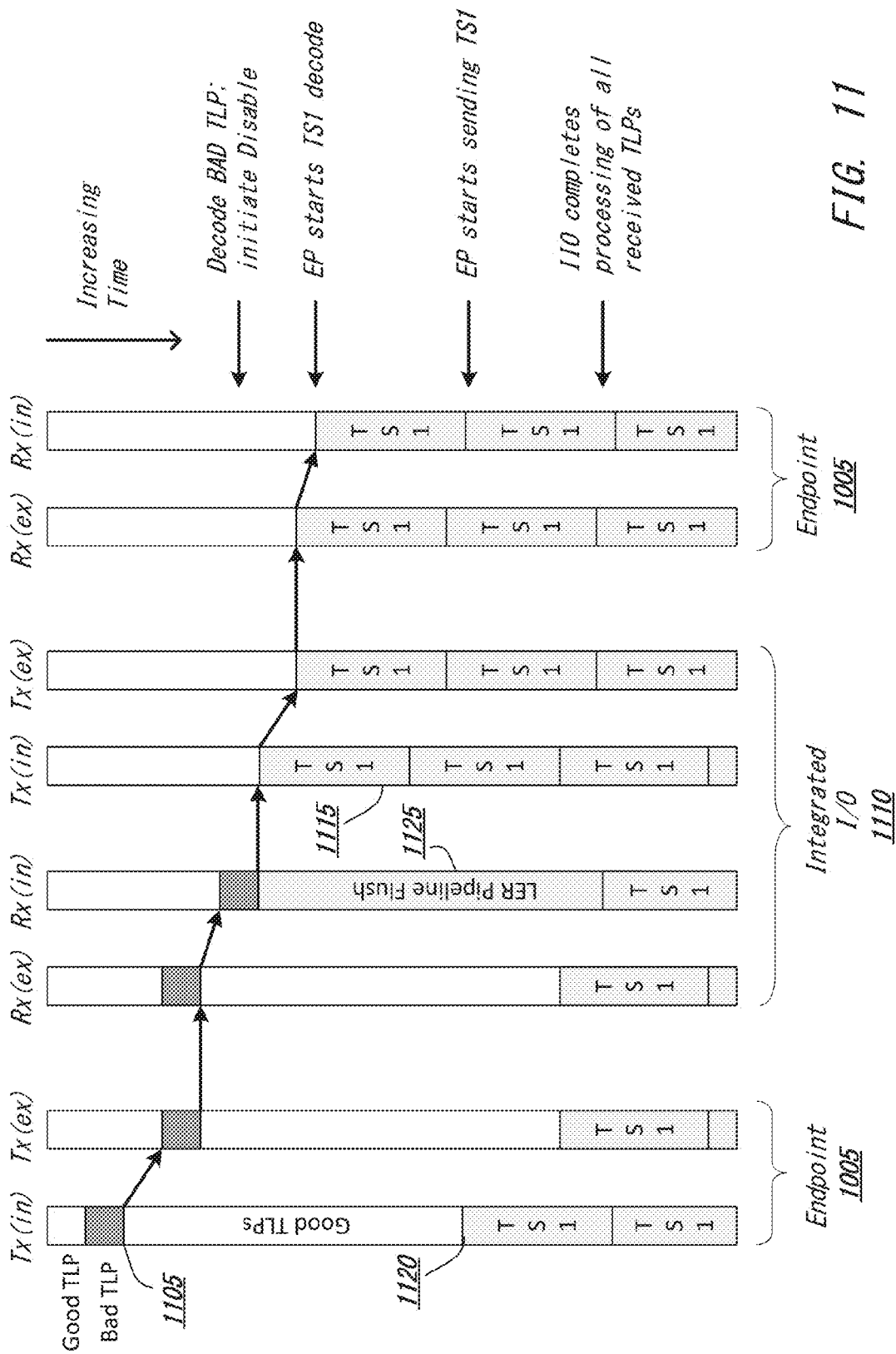
FIG. 11 illustrates another flow diagram of an example entry into an error recovery mode.

FIG. 11 illustrates another representation of an example transition into an LER mode. A malformed or other erroneous TLP (e.g., "bad" packet 1105) can be processed by the transmitter of an endpoint 1005 and released on the transmitter (Tx(ex)) of the endpoint 1005 on a PCIe link to be processed by the integrated I/O logic (IIO) 1110 (e.g., of a port). The IIO can decode the bad TLP 1105 and determine (e.g., from LER error masks) that the TLP 1105 is to trigger an LER event and the bad TLP 1105 can be dropped. Accordingly, the IIO 1110 can initiate the forcing down of the link by going into a recovery state and then, from the recovery state to a disabled state. Further, the IIO can begin sending disable training sequences (e.g., 1115). Further, the receiver (Rx(ex)) of the endpoint 1005 can receive the training sequences and identify that the link is being brought down and cease sending TLPs and begin, itself, repeating the training sequences (e.g., at 1120). In one example, training sequences can include a 16-byte TS1 training sequence, among other potential examples. Training sequences (e.g., 1115) can be sent to direct the link into recovery state. The training sequences can be sent with the disabled bit set, so that both links enter disabled state.

In accordance with the assertion of an LER signal and entry into an LER state, a flush (e.g., 1125) of the IIO pipeline can commence. TLPs can be buffered in IIO switch queues. In LER, a flush can include the draining the queues, decoding each of the TLPs received from the endpoint 1005 up to when the endpoint 1005 quits sending TLPs, and dropping the packets from the retry buffers. The transaction layer can also discard any outstanding transactions. For instance, entering a disabled state can cause the data link layer to transition into a DL_Inactive state, which can cause all packets in the Data Link Layer Retry Buffer to be discarded, and the transaction layer to discard any outstanding transactions. Additionally, as described above, LER mode can further include synthesizing one or more dropped completion packets, changing a severity of the LER condition (e.g., to correctable), among other examples. When all inbound and outbound queues have been drained, all registers have been cleared, and the LER status bit cleared, the link can be brought out of LER mode and re-trained.

Errors involving outgoing packets can be handled similarly to errors resulting from inbound packets. In one example, if an incoming non-posted requests results in a completion being returned with Unsupported Request or Completer Abort status, these completions may be dropped and trigger LER mode. In another example, if an outbound parity error or poisoned TLP triggers an LER, such poisoned TLPs can be dropped. In the case of a non-fatal poison error detected at a port outbound, an error can be logged in standard error log registers on the inbound path and the offending packet can be dropped. Further, as with inbound errors, the enabling of LER mode can result in generation of a correctable error interrupt, instead of a non-fatal or fatal uncorrectable interrupt (e.g., if the LER severity remapping feature is enabled). Further, LER mode triggered for outbound error can further result in the PCI Express port link is forced down, with all outbound requests to that link aborted and outbound completions dropped, including the request or completion that caused the error. The link can then enter recovery as in previous examples.

Similar principles can also be applied to non-packet errors. For instance, LER, as described above, can be used for isolating errors to a defective port. For instance, LER can disable the port that detected errors that are considered fatal and could cause system shutdown. Such fatal errors can include, for example, flow control protocol errors, surprise down errors, and data link layer protocol errors, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
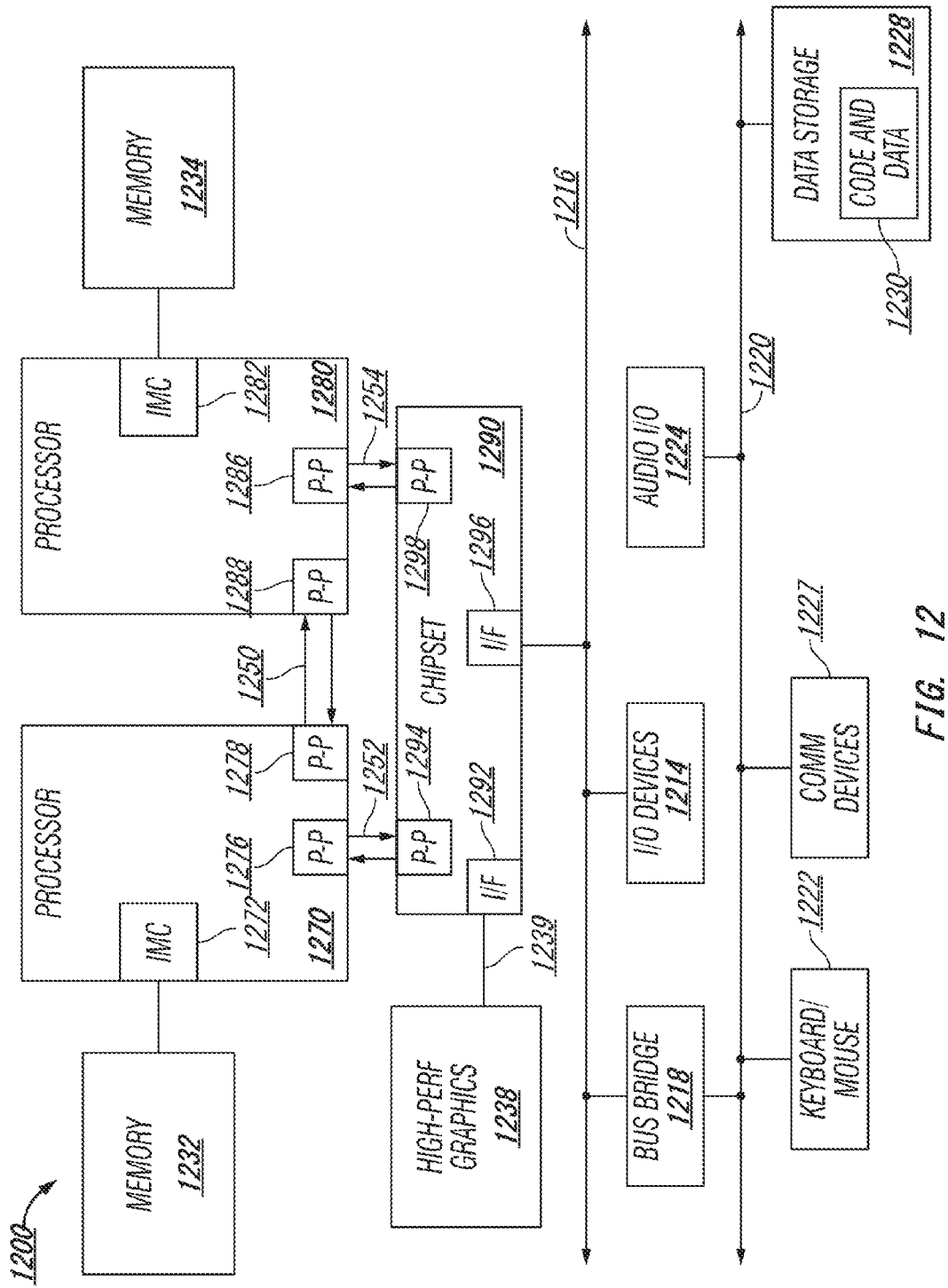
FIG. 12 illustrates an embodiment of a block for a computing system including multiple processor sockets.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Figure 13:
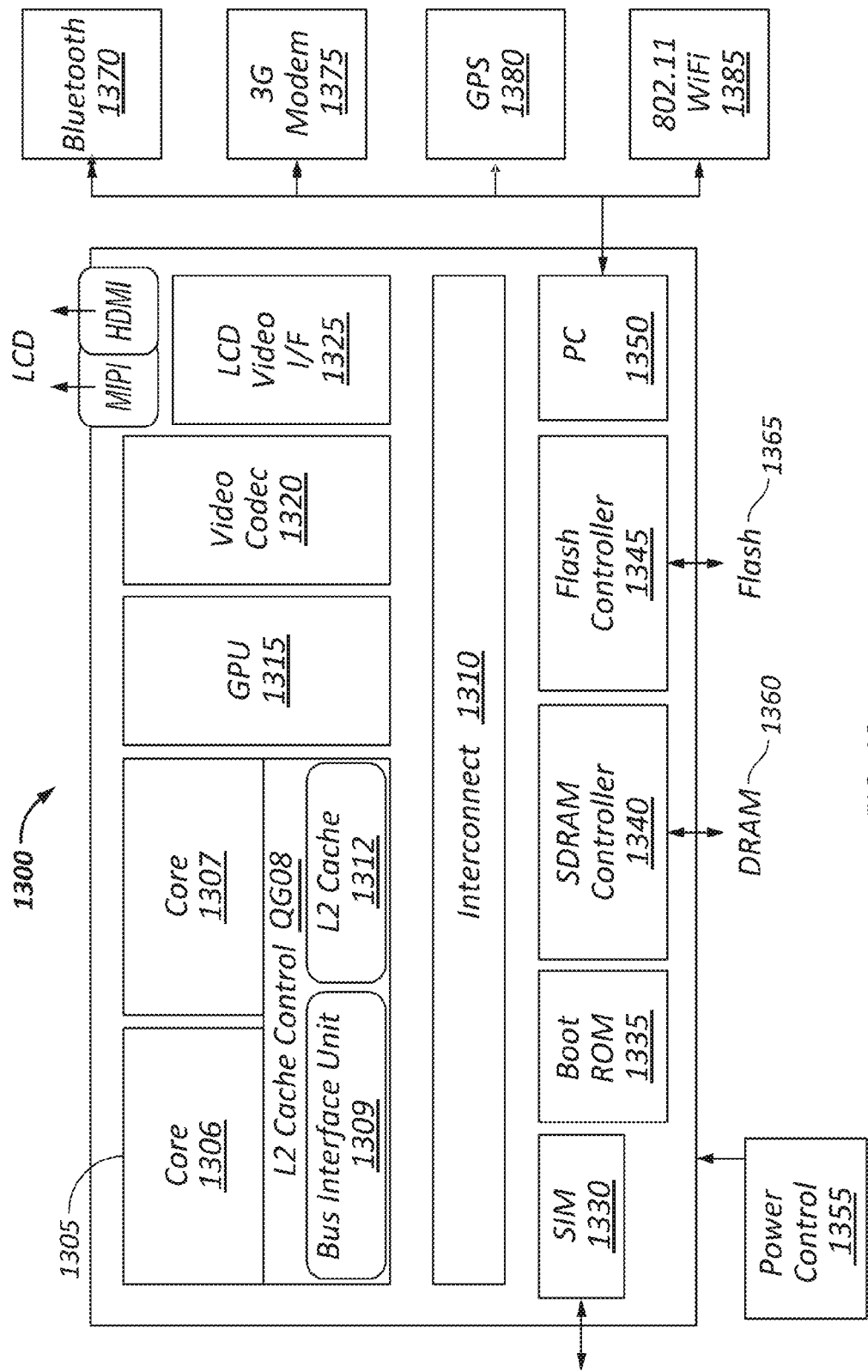
FIG. 13 illustrates another embodiment of a block diagram for a computing system.

Turning next to FIG. 13, an embodiment of a system on-chip (SOC) design in accordance with the inventions is depicted. As a specific illustrative example, SOC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores-1306 and 1307. Similar to the discussion above, cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1312 to communicate with other parts of system 1300. Interconnect 1310 includes an on-chip interconnect, such as an IOSF, AMBA, or other interconnect discussed above, which potentially implements one or more aspects of the described invention.

Interface 1310 provides communication channels to the other components, such as a Subscriber Identity Module (SIM) 1330 to interface with a SIM card, a boot rom 1335 to hold boot code for execution by cores 1306 and 1307 to initialize and boot SOC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the invention described herein.

In addition, the system illustrates peripherals for communication, such as a Bluetooth module 1370, 3G modem 1375, GPS 1385, and WiFi 1385. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

The following examples pertain to embodiments in accordance with this Specification. One or more embodiments may provide an apparatus, a system, a machine readable storage, a machine readable medium, and a method to identify a packet at a port of a serial data link, identify a packet at a port of a serial data link, determine that the packet is associated with an error, and initiate entry into an error recovery mode based on the determination that the packet is associated with the error. Entry into the error recovery mode can cause the serial data link to be forced down.

In at least one example, forcing the data link down causes all subsequent inbound packets to be dropped.

In at least one example, forcing the data link down further causes all pending outbound requests and completions to be aborted.

In at least one example, error logic is to generate and send a master abort completion for one of the aborted completions.

In at least one example, error logic is further to drop the packet.

In at least one example, the error is at least one of a transaction layer packet error, a flow control protocol error, and a data link layer protocol error.

In at least one example, the error logic is further to determine that the error is one of a set of errors that is to trigger the error recovery mode.

In at least one example, the set of errors is identifiable from an error mask register corresponding to the error recovery mode.

In at least one example, the set of errors is further included in errors identified as uncorrectable errors by another error mask.

In at least one example, entering the error recovery mode includes entering a disable state.

In at least one example, the error is associated with an uncorrectable severity and the error logic is further to force association of the error with a correctable severity.

In at least one example, the error logic is further to cause the error to be corrected.

In at least one example, the error logic is further to identify that all transactions on the data link have been dropped and identify that all error registers for the data link have been cleared.

In at least one example, the error logic is to determine that the transactions have been dropped based on a quisced control bit value of a register.

In at least one example, the error logic is to clear an error recovery bit of a status control register corresponding to the data link based on identifying that all transactions on the data link have been dropped and that all error registers for the data link have been cleared.

In at least one example, the error logic is further to initiate retraining of the link based on the clearing of the error recovery bit. The error recovery bit can indicate whether error recovery mode is active or not.

In at least one example, entry into the error recovery mode is to be initiated on a same clock cycle as detection of the error.

In at least one example, forcing down the data link includes entering a recovery state, and transitioning from the recovery state to a disabled state.

In at least one example, forcing down the data link includes sending a sequence of training sequences, and the training sequences include a bit indicating an attempted entry into the disabled state.

In at least one example, the error is designated an uncorrectable error, but the error is to be designated as a correctable error, where the error instead causes a correctable error interrupt.

In at least one example, the packet is an outbound packet to be sent to another device over the data link.

In at least one example, the packet is an inbound packet received from another device over the data link.

In at least one example, the packet is sent over an interconnect, and, in some instances, a Peripheral Component Interconnect Express (PCIe)-compliant interconnect.

In at least one example, the packet is communicated between a first and second microprocessor.

One or more embodiments may provide an apparatus, a system, a machine readable storage, a machine readable medium, and a method to interface with a serial data link, receive a packet communicated using the data link, determine that the packet is associated with an error, and initiate entry into an error recovery mode based on the determination that the packet is associated with the error. Entry into the error recovery mode can cause an inbound packet to be dropped and an outbound request to be aborted.

In at least one example, interface logic is to abort all pending outbound requests and completions during error recovery mode.

In at least one example, interface logic is to drop all inbound packets during error recovery mode.

One or more embodiments may provide an apparatus, a system, a machine readable storage, a machine readable medium, and a method to provide error logic, with transaction layer logic, data link layer logic, and physical layer logic, to detect a particular error associated with a particular packet, determine, based on a first register value, that the particular error is to be designated as an uncorrectable error, determine, based on a second register value, that the particular error is to trigger an error recovery mode, wherein the error recovery mode is to cause inbound and outbound packets subsequent to the particular error to be dropped, determine from a third register value whether the error recovery mode is enabled, and service the particular error based at least in part on the first, second, and third register values.

In at least one example, the error logic is further to initiate the error recovery mode based on a determination that the third register value indicates that the error recovery mode is enabled, and initiating the error recover mode includes asserting an error recovery status control bit of a register.

In at least one example, the error logic is further to identify that the error recovery status control bit is cleared, and initiate reactivation of the data link based on the clearing of the error recovery status control bit.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a receiver to receive a packet at a particular port of a serial data link;
   error logic comprising circuitry to:
      determine that the packet is associated with an uncorrectable error;
      determine, from one or more bits in a capability register, that a particular error containment mode is enabled for the particular port;
      initiate entry into the particular error containment mode based on the determination that the packet is associated with the error and the determination that the particular error containment mode is enabled, wherein entry into the particular error containment mode is to cause traffic on the serial data link to be halted downstream from the port without a system-wide reset; and
      send a signal to identify the uncorrectable error as a correctable error based on entry into the particular error containment mode.

2. The apparatus of claim 1, wherein forcing the serial data link down causes all subsequent inbound packets to be dropped.

3. The apparatus of claim 2, wherein forcing the serial data link down further causes all pending outbound requests and completions to be aborted.

4. The apparatus of claim 3, wherein the error logic is further to generate and send a master abort completion for one of the completions caused to be aborted.

5. The apparatus of claim 1, wherein the error logic is further to drop the packet.

6. The apparatus of claim 1, wherein the error is at least one of a group comprising: a transaction layer packet error, a flow control protocol error, and a data link layer protocol error.

7. The apparatus of claim 1, wherein the error logic is further to determine that the uncorrectable error is one of a set of errors that is to trigger the live error recovery mode.

8. The apparatus of claim 7, wherein the set of errors is identifiable from an error mask register corresponding to the live error recovery mode.

9. The apparatus of claim 8, wherein the set of errors is further included in errors identified as uncorrectable errors by a particular error mask.

10. The apparatus of claim 1, wherein entering the live error recovery mode includes entering a disable state.

11. The apparatus of claim 1, wherein the error logic is further to force association of the uncorrectable error with a correctable severity.

12. The apparatus of claim 11, wherein the error logic is further to cause the uncorrectable error to be corrected.

13. The apparatus of claim 1, wherein the error logic is further to identify that all transactions on the serial data link have been dropped and identify that all error registers for the serial data link have been cleared.

14. The apparatus of claim 13, wherein the error logic is to determine that the transactions have been dropped based on a quiesced control bit value of a register.

15. The apparatus of claim 13, wherein the error logic is to clear an error recovery bit of a status control register corresponding to the serial data link based on identifying that all transactions on the serial data link have been dropped and that all error registers for the serial data link have been cleared.

16. The apparatus of claim 15, wherein the error logic is further to initiate retraining of the serial data link based on the clearing of the error recovery bit, wherein the error recovery bit indicates whether live error recovery mode is active.

17. The apparatus of claim 1, wherein the error logic is further to determine a type of the uncorrectable error, and the signal to identify the uncorrectable error as a correctable error is to be sent based at least in part on the type of the uncorrectable error.

18. An apparatus comprising:
   an agent to support communication on a serial data link;
   a memory comprising a capability register;
   a receiver to receive a packet;
   error logic comprising circuitry to:
      determine that the packet is associated with an uncorrectable error;
      determine, from one or more bits in the capability register, that a particular error containment mode is enabled for the particular port; and initiate entry into the particular error containment mode based on the determination that the packet is associated with the error and the determination that the particular error containment mode is enabled, wherein entry into the particular error containment mode is to cause interface logic to drop an inbound packet and abort an outbound request; and a transmitter to send a signal to identify the uncorrectable error as a correctable error based on entry into the particular error containment mode.

19. A system comprising:

a first device;

a second device to be communicatively coupled to the first device over an interconnect, the second device comprising error logic executable to:

identify a packet at a port coupled to a serial data link of the interconnect;

determine that the packet is associated with an uncorrectable error;

determine, from one or more bits in a capability register, that a particular error containment mode is enabled for the particular port;

initiate the particular error containment mode on the port based on the determination that the packet is associated with the uncorrectable error and the determination that the particular error containment mode is enabled, wherein the particular error containment mode is to contain the error to the port by disabling the serial data link downstream from the port; and send a signal to identify the uncorrectable error as a correctable error based on entry into the particular error containment mode.

20. The system of claim 19, wherein the interconnect is compliant with a Peripheral Component Interconnect Express (PCIe) based interconnect protocol.

* * * * *